Feb. 23, 1932.   J. H. GRINTER   1,847,004
PORTABLE TRASH BURNER
Filed Feb. 27, 1931   2 Sheets-Sheet 1
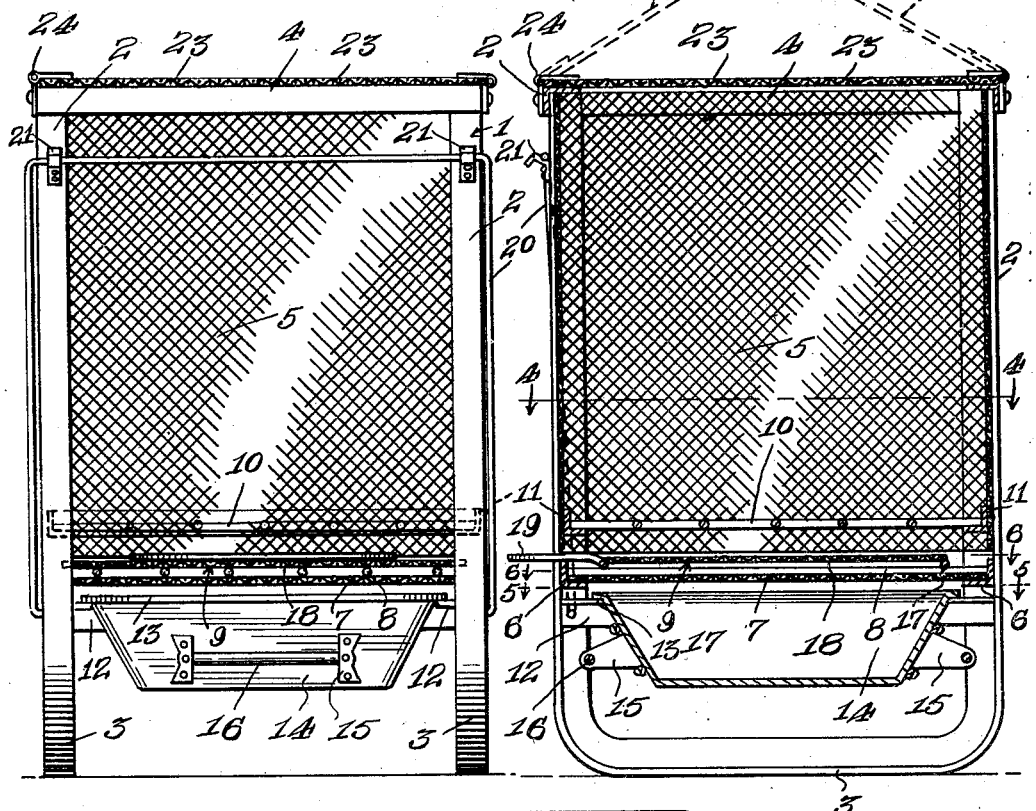
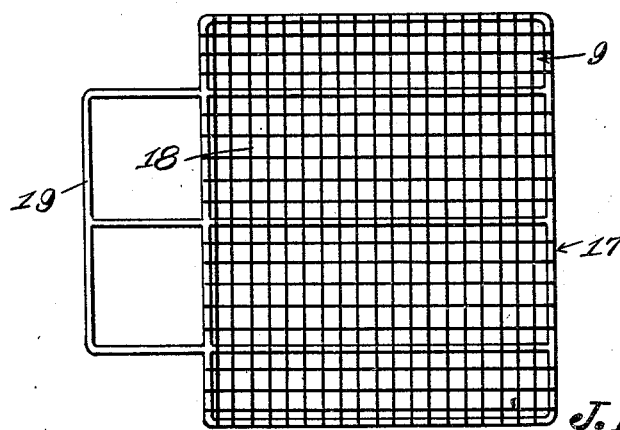
J. H. Grinter
INVENTOR
WITNESS:
BY
ATTORNEY Feb. 23, 1932.   J. H. GRINTER   1,847,004
PORTABLE TRASH BURNER
Filed Feb. 27, 1931   2 Sheets-Sheet 2
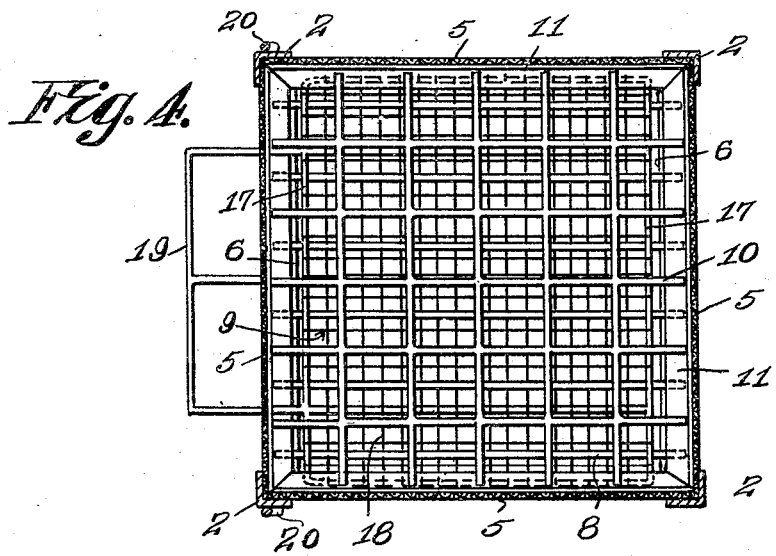
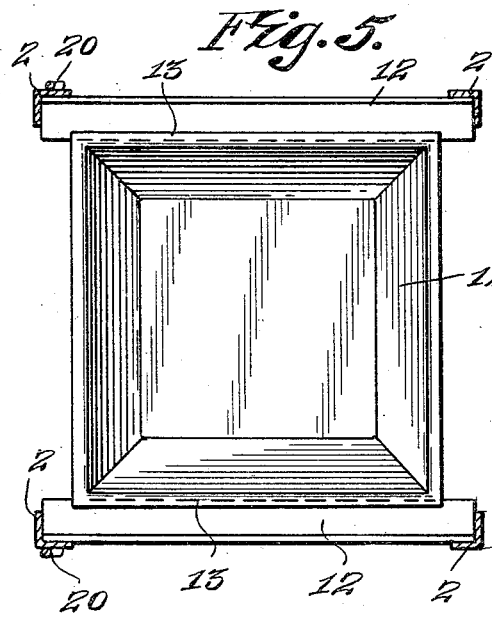
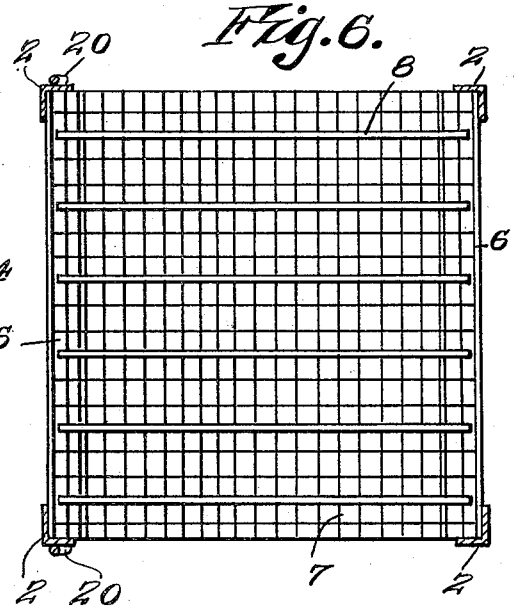

Patented Feb. 23, 1932

1,847,004

UNITED STATES PATENT OFFICE

JOHN H. GRINTER, OF INDEPENDENCE, MISSOURI

PORTABLE TRASH BURNER

Application filed February 27, 1931. Serial No. 518,863.

This invention relates to improvements in rubbish burners especially adaptable for burning leaves and other trash as raked from lawns and like places and has for the primary object the provision of a device of the above stated character whereby the leaves and other trash may be placed therein and thoroughly burnt while the device is positioned on the lawn without the danger of injuring the grass by the fire or the heat therefrom and thereby provide a convenient, efficient and practical device for consuming the leaves and trash as rapidly as raked or removed from the lawn.

Another object of this invention is the provision of means whereby the device may be conveniently moved from one place to another while burning the leaves and trash and which is equipped with means for catching and retaining the ashes, that the latter may be easily removed and scattered over the lawn for fertilizer to the grass.

A further object of this invention is the provision of a portable trash burner of the above stated character which will be simple, durable and efficient and which may be manufactured and sold at a comparatively low cost.

With these and other objects in view, as will become more apparent as the description proceeds, this invention consists in certain novel features of construction, combination and arrangement of parts, to be hereinafter more fully described and claimed.

For a complete understanding of my invention, reference is to be had to the following description and accompanying drawings, in which Figure 1 is a front elevation illustrating a portable trash burner constructed in accordance with my invention.

Figure 2 is a sectional view illustrating the same with the cover shown partially open to admit leaves and trash to the device.

Figure 3 is a plan view illustrating the shaker screen.

Figure 4 is a sectional view taken on the line 4—4 of Figure 2.

Figure 5 is a sectional view taken on the line 5—5 of Figure 2.

Figure 6 is a sectional view taken on the line 6—6 of Figure 2.

Referring in detail to the drawings, the numeral 1 indicates a substantially rectangular shaped frame including vertically disposed members 2 constructed from channel iron and curved and integrally connected at their lower ends to form runners 3 on which the frame rests. The upper ends of the members 2 may be connected to a reinforcing frame 4. The members 2 have foraminous material 5 secured thereto for the purpose of forming walls 5 and which material is also connected to the reinforcing frame 4 and has the lower edges secured to a lower angle iron frame 6 on which is positioned a foraminous bottom 7 preferably constructed from wire mesh and reinforcing bars 8 thereover which also slidably support a shaker screen 9 positioned directly under a grate 10. The grate 10 is of skeleton formation and supported by brackets 11 secured to the vertical members 2 on which the leaves and trash may be positioned for burning, permitting the ashes therefrom to fall upon the shaker screen 9 and the bottom 7. The leaves and trash supported away from the bottom permits thorough consumption of the fire.

Positioned below the bottom 7 are supporting bars 12 slidably engaged by the flanged upper edge 13 of the ash tray 14, thus it will be seen that the ash tray is positioned under the bottom to receive the ashes therefrom during the agitation of the shaker screen 9. Brackets 15 are secured to the end walls of the ash tray and provided with handles 16 whereby the tray may be removed from the device when desiring to scatter the ashes over the grass of the lawn. The ash tray as well as the bottom 7 of the device is supported a considerable distance from the ground by the runners 3 consequently permitting a thorough circulation of air under the device to provide a proper draft for the fire and prevent the heat from the fire scorching or burning the grass under the device. The tray 14 is preferably provided with flared walls so as to efficiently catch the ashes from the bottom 7 and to facilitate scattering of the ashes from the pan over the grass of the lawn.

The shaker screen 9 comprises a rectangular frame 17 carrying foraminous material 18 and provided at one side with a suitable handle 19 extending outwardly of the device whereby the shaker screen 9 may be moved relative to the grate 10 and bottom 7 for causing the ashes to fall into the pan 14. With this construction, it is possible during the burning of leaves and trash to remove the pan for the purpose of emptying the ashes therein without the ashes falling onto the grass or ground.

A suitable handle 20 is pivoted to a pair of the vertical members 2 adjacent their lower ends whereby a person may conveniently pull the device from one place to another with the runners 3 sliding upon the ground. Keepers 21 are carried by a pair of the vertical members 2 for the purpose of retaining the handle in an elevated position when the device is in non-use.

A pair of covers 23 are hinged to the reinforcing frame as shown at 24 providing a construction wherein the device may be opened when desiring to place leaves and trash therein or upon the grate 10. The covers 23 are constructed from wire mesh or other foraminous material and during the burning of the leaves or trash in a wind of high velocity, the covers 23 may be placed in a closed position as shown in Figure 1 preventing sparks or lighted leaves from escaping from the device.

While I have shown and described the preferred embodiment of my invention, it will be understood that minor changes in construction, combination and arrangement of parts may be made without departing from the spirit and scope of the invention, as claimed.

Having thus described my invention, what I claim is:

1. A portable trash burner comprising a frame, foraminous material carried by said frame to provide vertical and bottom walls, a cover for said frame, runners for said frame, a grate carried by the frame above the bottom wall, a removable ash tray carried by the frame below the bottom wall, and a shaker screen slidably mounted on the bottom wall below the grate.

2. A portable trash burner comprising a frame, vertical and bottom foraminous walls carried by said frame, a grate in said frame, supporting members connected to the frame below the bottom wall, a flanged ash tray slidably mounted on said supporting members, handles for said tray, and runners carried by the frame to support the tray and bottom wall a distance above the surface of the ground.

3. A portable trash burner comprising a frame including vertical uprights having their lower ends curved and integrally connected to form runners, vertical and bottom walls of foraminous material secured to the frame, a cover for the frame, a grate for the frame, an ash tray supported by the frame under the grate and above the runners, and a handle secured to the frame.

In testimony whereof I affix my signature.

JOHN H. GRINTER.